United States Patent
Meier et al.

(10) Patent No.: US 9,418,010 B2
(45) Date of Patent: Aug. 16, 2016

(54) GLOBAL MAINTENANCE COMMAND PROTOCOL IN A CACHE COHERENT SYSTEM

(71) Applicant: Apple Inc., Cupertino, CA (US)

(72) Inventors: Stephan G Meier, Los Altos, CA (US); Gerard R Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 344 days.

(21) Appl. No.: 13/864,670

(22) Filed: Apr. 17, 2013

(65) Prior Publication Data

US 2014/0317358 A1    Oct. 23, 2014

(51) Int. Cl.
| G06F 12/00 | (2006.01) |
| G06F 13/00 | (2006.01) |
| G06F 13/28 | (2006.01) |
| G06F 12/08 | (2016.01) |
| G06F 12/10 | (2016.01) |

(52) U.S. Cl.
CPC .......... *G06F 12/0833* (2013.01); *G06F 12/084* (2013.01); *G06F 12/0815* (2013.01); *G06F 12/0817* (2013.01); *G06F 12/0804* (2013.01); *G06F 12/0806* (2013.01); *G06F 12/1027* (2013.01)

(58) Field of Classification Search
CPC ............ G06F 12/0815; G06F 12/0817; G06F 12/0828; G06F 12/0833; G06F 9/30145; G06F 9/3001; G06F 13/24; G06F 1/08; G06F 12/084; G06F 12/0806; G06F 12/1027; G06F 12/0804
USPC ............ 711/119, 124, 141–146, 130; 712/32, 712/40
See application file for complete search history.

(56) References Cited

U.S. PATENT DOCUMENTS

| 7,882,307 | B1 | 2/2011 | Wentzlaff et al. |
| 2008/0082622 | A1* | 4/2008 | Pong ........................... 709/212 |
| 2010/0322250 | A1 | 12/2010 | Shetty et al. |
| 2011/0161599 | A1 | 6/2011 | Craske |
| 2011/0271057 | A1* | 11/2011 | Karlsson ..................... 711/122 |
| 2012/0124297 | A1* | 5/2012 | Chung ............... G06F 12/0817 711/141 |

OTHER PUBLICATIONS

"ARM11 MPCore Processor Technical Reference Manual—5.7.5 Explicit memory barriers", 2008, Arm Information Center Revision: r1p0, pp. 1-2.*

* cited by examiner

*Primary Examiner* — Yong Choe
*Assistant Examiner* — Shane Woolwine
(74) *Attorney, Agent, or Firm* — Meyertons, Hood, Kivlin, Kowert & Goetzel, P.C.

(57) ABSTRACT

A system may include a command queue controller coupled to a number of clusters of cores, where each cluster includes a cache shared amongst the cores. An originating core of one of the clusters may detect a global maintenance command and send the global maintenance command to the command queue controller. The command queue controller may broadcast the global maintenance command to the clusters including the originating core's cluster. Each of the cores of the clusters may execute the global maintenance command. Each cluster may send an acknowledgement to the command queue controller upon completed execution of the global maintenance command by each core of the cluster. The command queue controller may also send, upon receiving an acknowledgement from each cluster, a final acknowledgement to the originating core's cluster.

20 Claims, 7 Drawing Sheets

GLOBAL MAINTENANCE COMMAND PROTOCOL IN A CACHE COHERENT SYSTEM

BACKGROUND

1. Technical Field

This disclosure relates generally to global maintenance commands, and more particularly to apparatus, methods, and products for broadcasting global maintenance commands in a cache coherent system.

2. Description of the Related Art

In recent years, mobile devices such as smart phones and tablet computers have become increasingly sophisticated. In addition to supporting telephone calls, many mobile devices now provide access to the internet, email, text messaging, and navigation using the global positioning system (GPS). Mobile devices that support such sophisticated functionality often include many components.

In such mobile devices, a processor may be configured with many core clusters, each of which includes multiple processing cores. Additionally, each core cluster may include a cache. In such a processor, the core cluster caches may be configured to be coherent. To maintain coherency amongst the caches some commands, such as maintenance commands, may be executed by all cores in the system.

SUMMARY

Various example system, methods, and products disclosed. Example systems include a number of clusters of cores, where each cluster includes a cache shared amongst the cores of the cluster. Such systems may also include a command queue controller coupled to each of the clusters. In such a system, an originating core of one of the clusters of cores is configured to detect a global maintenance command and send, to the command queue controller, the global maintenance command. Such a command queue controller may be configured to broadcast the global maintenance command to one or more of the clusters including the originating core's cluster. Each of the cores of the clusters receiving the broadcast may be configured to execute the global maintenance command. Each cluster receiving the broadcast may be configured to send an acknowledgement to the command queue controller upon completed execution of the global maintenance command by each core of each cluster receiving the broadcast. The command queue controller may also be configured to send, upon receiving an acknowledgement from each cluster receiving the broadcast, a final acknowledgement to the originating core's cluster.

Example methods may include detecting, by an originating core of one of a plurality of clusters of cores, a global maintenance command, where each cluster includes a cache shared amongst the cores of the cluster. Such methods may also include sending, by the originating core's cluster to a command queue controller, the global maintenance command. Such methods may also include broadcasting, by the command queue controller, the global maintenance command to one or more of the clusters including the originating core's cluster. Such methods may also include executing the global maintenance command by each of the cores of the clusters receiving the broadcast. Such methods may also include sending, by each cluster receiving the broadcast, an acknowledgement to the command queue controller upon completed execution of the global maintenance command by each core of each cluster receiving the broadcast. Such methods may also include, upon receiving an acknowledgement from each cluster receiving the broadcast, sending, by the command queue controller, to the originating core's cluster, a final acknowledgement.

Example products may include a computer readable storage medium including program instructions executable by a processor to detect, by an originating core of one of a plurality of clusters of cores, a global maintenance command, wherein each cluster includes a cache shared amongst the cores of the cluster; send, by the originating core's cluster to a command queue controller, the global maintenance command; broadcast, by the command queue controller, the global maintenance command to one or more of the clusters including the originating core's cluster; execute the global maintenance command by each of the cores of the clusters receiving the broadcast; send, by each cluster receiving the broadcast, an acknowledgement to the command queue controller upon completed execution of the global maintenance command by each core of each cluster receiving the broadcast; and upon receiving an acknowledgement from each cluster receiving the broadcast, send, by the command queue controller, to the originating core's cluster, a final acknowledgement.

Figure 1:
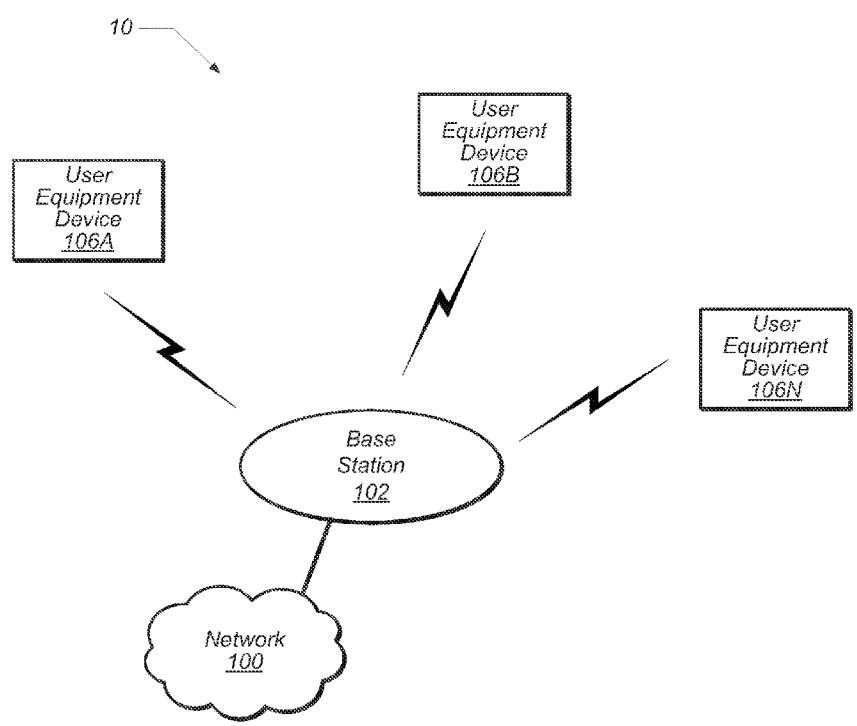
FIG. 1 sets forth a block diagram of one embodiment of a wireless communication system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

FIG. 1 sets forth a block diagram of one embodiment of a wireless communication system. The system of FIG. 1 is one example of any of a variety of wireless communication systems. The wireless communication system 10 includes a base station 102 which communicates over a wireless transmission medium such as, for example, an over the air interface with one or more user equipment (UE) devices, 106A through 106N. The base station 102 is also coupled a network 100 via another interface, which may be wired or wireless. Components identified by reference designators that include both a number and a letter may be referred to by the only a number where appropriate.

The base station 102 may be a base transceiver station (BTS) or cell site, and may include hardware that enables wireless communication with one or more of the UEs 106. The base station 102 may also be equipped to communicate with the network 100. Thus, the base station 102 may facilitate communication between the UEs 106 and/or between the UEs 106 and the network 100. The communication area (or coverage area) of the base station 102 may be referred to as a "cell." In various embodiments, the base station 102 and the UEs may be configured to communicate over the transmission medium using any of various wireless communication radio access technologies such as LTE, eHRPD, GSM, CDMA, WLL, WAN, WiFi, WiMAX, etc. In embodiments that communicate using the eHRPD standard, the BTS 102 may be referred to as an HRPD BTS, and the network 100 may include an eAN/ePCF and a number of gateways including HRPD gateway (HSGW), a PDN gateway (P-GW), and a number of policy and packet control functions that may be associated with a service provider, for example.

In one embodiment, each of the UEs 106A-106N may be representative of a device with wireless network connectivity such as a mobile phone, a hand-held device, a computer or a tablet, or virtually any type of wireless device. As described further below, the UE 106 may include at least one processor that is configured to execute program instructions stored in a memory. Accordingly, in some embodiments, the UE 106 may perform one or more portions of the functionality described below by executing such stored instructions. However, in other embodiments, the UE 106 may include one or more hardware elements and/or one or more programmable hardware elements such as an FPGA (field-programmable gate array) that may be configured to perform the one or more portions the functionality described below. In still other embodiments, any combination of hardware and software may be implemented to perform the functionality described below.

In the system 10 of FIG. 1, any of the UEs 106 may include a processor that, in turn, includes a number of core clusters. A core cluster, as the term is used in this specification, refers to a logically and/or physically organized group of cores. The term 'core' here may refer to a processing core in a central processing unit (CPU), a graphics processing core in a graphics processor, or another type of core as will occur to those of skill in the art.

Each core cluster in the processor may include a cache, such as, for example, an L2 instruction or data cache. The caches of the core clusters may be configured as to be coherent within the processor. In some example embodiments, a command queue controller, as explained below, aids in maintaining coherency among the caches.

In some embodiments, a core in one of the core clusters may detect, during execution, a global maintenance command. Such a core is referred to in this specification as an 'originating' core. A maintenance command may refer to a command that, when executed, carries out a maintenance operation such as a cache sync operation, and invalidate cache way operation, an invalidate cache line operation, clean and invalidate operation, and others. A maintenance command is referred to as 'global' in this specification when the maintenance command is to be broadcast to and executed by more than one core in more than one cluster. Examples of such global maintenance commands may include data cache maintenance commands, translation lookaside buffer (TLB) maintenance commands, a data synchronization barrier (DSBs) that follows another global maintenance command, and others. It is noted that in some embodiments, a global maintenance command may be broadcast to all cores of all core clusters in a system or processor. In other embodiments (as described below), however, a global maintenance command may be broadcast to fewer than all cores of all clusters.

Once a global maintenance command is detected by the originating core, the originating core may cause the global maintenance command to broadcast to one or more cores of other core clusters. An example protocol for such broadcast is described below in further detail.

Figure 2:
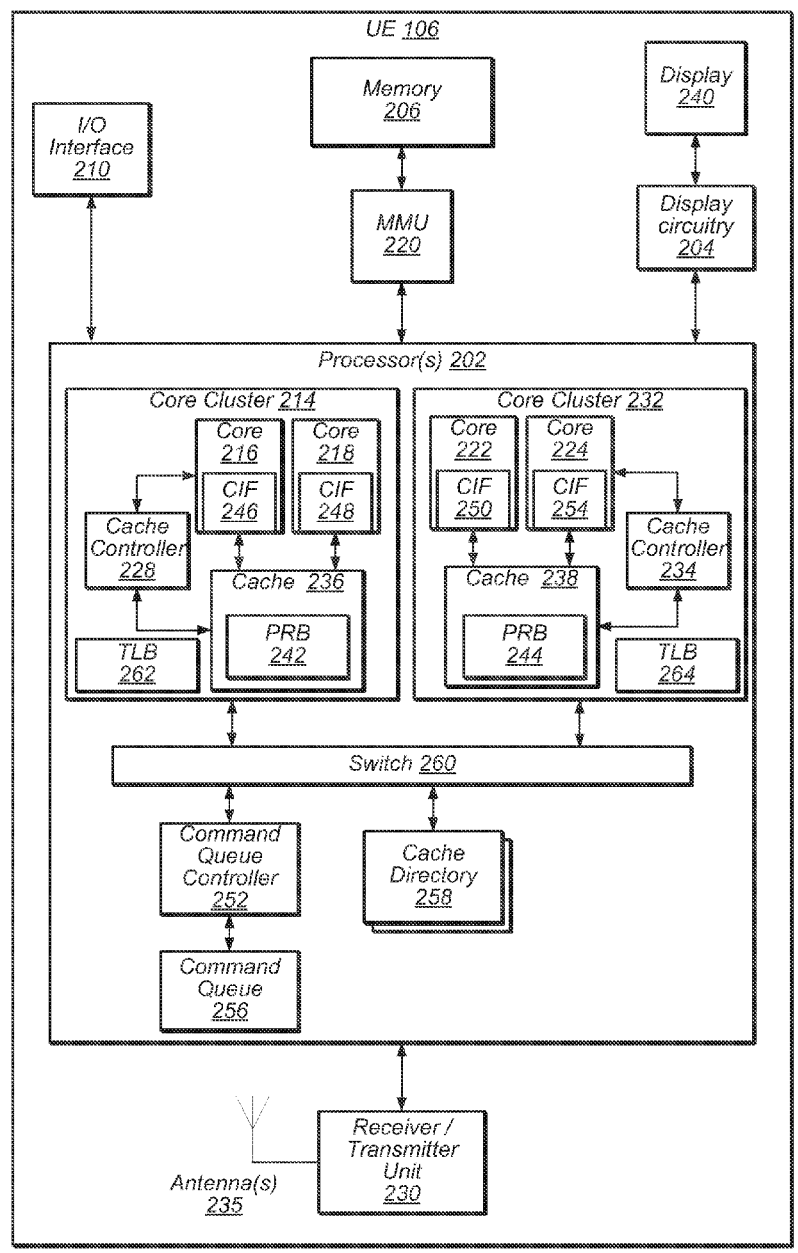
FIG. 2 sets forth a block diagram of one embodiment of a wireless communication device shown in FIG. 1.

For further explanation, FIG. 2 sets forth a block diagram of one embodiment of a wireless communication device shown in FIG. 1. The UE 106 includes one or more processors 202 (or one or more processor cores 202) which are coupled to display circuitry 204 which is in turn coupled to the display 240. The display circuitry 204 may be configured to perform graphics processing and provide display signals to the display 240.

The one or more processors 202 are also coupled to a memory management unit (MMU) 220 and to a receiver/transmitter (R/T) unit 230. The MMU 220 is coupled to a memory 206. The UE 106 also includes an I/O interface 210 that is coupled to the processor(s) 202, and may be used for coupling the UE 106 to a computer system, or other external device. It is noted that in one embodiment the components shown within UE 106 of FIG. 2 may be manufactured as standalone components. In other embodiments, however, various ones of the components may be part of one or more chipsets or part of a system on chip (SOC) implementation.

In various embodiments, the processors 202 may be representative of a number of different types of processors that may be found in a wireless communication device. For example, the processors 202 may include general processing capability, digital signal processing capability, as well as hardware accelerator functionality, as desired. The processors 202 may include baseband processing and therefore may digitally process the signals received by the R/T unit 230. The processors 202 may also process data that may be transmitted by the R/T unit 230. The processors 202 may also perform a number of other data processing functions such as running an operating system and user applications for the UE 106.

In one embodiment, the MMU 220 may be configured to receive addresses from the one or more processors 202 and to translate those addresses to locations in memory (e.g., memory 206) and/or to other circuits or devices, such as the display circuitry 204, R/T unit 230, and/or display 240. The MMU 220 may also return data to one or more of the processors 202 from the locations in memory 206. The MMU 220 may be configured to perform memory protection and page table translation or set up. In some embodiments, the MMU 220 may be included as a portion of one or more of the processors 202.

The R/T unit 230 may, in one embodiment, include analog radio frequency (RF) circuitry for receiving and transmitting RF signals via the antenna 235 to perform the wireless communication. The R/T unit 230 may also include down-conversion circuitry to lower the incoming RF signals to the baseband or intermediate frequency (IF) as desired. For example, the R/T unit 230 may include various RF and IF filters, local oscillators, mixers, and the like. Since the UE 106 may operate according to a number of radio access technologies, the R/T unit 230 may include a corresponding number of RF front end portions to receive and down-convert, as well as up-convert and transmit the respective RF signals of each technology.

The processor 202 in the example of FIG. 2 may include multiple core clusters 214 and 232, with each core cluster including multiple cores 216, 218, 222, and 224. Each core may include a core interface 246, 248, 250, 254 that operates as an interface between the core and a cache 236, 238. Each core cluster 214, 232 may also include a cache controller 228, 234 configured to control various cache operations.

Each core cluster 214 and 232 may be coupled to a command queue controller 252 and cache coherency directories 258 through a switch 260. It is noted that the coupling of core clusters 214 and 232 through the switch 260 is but one example embodiment among possible embodiments for coupling the core clusters to other components of the processor 202.

The command queue controller 252 may manage a command queue 256 that, among other functions, may be utilized in the broadcast of global maintenance commands among the core clusters 214 and 232.

In some embodiments, each cache coherency directory 258 may be associated with one core cluster and, thus, one cache. Each cache coherency directory 258 may include state information describing the state of cache lines in the cache associated with the cache coherency directory 258.

Each core cluster 214, 232 may also include a translation lookaside buffer (TLB). The TLB in each cluster may be local to cluster and may be utilized for virtual to physical address translation.

For further explanation, FIGS. 3A, 3B, 4A, 4B, and 5 set forth data flow diagrams of an example protocol for broadcasting a global maintenance command in the example processor 202 of FIG. 2. Beginning with the FIG. 3A, an originating core 216 of one of the core clusters 214 detects a global maintenance command 302. Upon detecting the global maintenance command 302, the originating core 216 may store an origination entry for the global maintenance command in a pending request buffer 242 established in the cache 236 of the originating core's cluster 214. The origination entry may include a field for an identification of the global maintenance command and a field for final acknowledgement of completion. Upon creation of the entry, the final acknowledgement field (which may be implemented as a single bit in some embodiments) may be set to indicate that the cluster has not yet received a final acknowledgement. A final acknowledgement, as explained below in greater detail, is an indication, received from the command queue controller 252, that all cores in all clusters receiving the broadcasted global maintenance command have completed local execution of the global maintenance command.

The cache controller 228 of the originating core's cluster 214 may process the pending request buffer 242 and, upon detecting the originating entry in the pending request buffer, may send the global maintenance command 302 to the command queue controller 252. The cache controller 228 may be configured to process the pending request buffer in various ways including, for example, by processing entries of the pending request buffer according to a round robin selection algorithm based on at least one of command type and a memory region associated with each command. That is, in some embodiments, the cache controller may arbitrate processing of each entry in the pending request buffer according to one or more predefined protocols.

Upon receiving the global maintenance command] 302, the command queue controller 252 may be configured to establish an entry for the global maintenance command in the command queue 256. The entry in the command queue 256 may include a field identifying the global maintenance command 302, a field indicating an originating core or originating cluster, and a plurality of fields indicating status of completion of the global maintenance command 302 by each of the clusters that receive the broadcasted global maintenance command 302. At creation, the fields indicating completion of the global maintenance command 302 by the clusters may be set to indicate that the command queue controller 252 has not yet received an indication of each corresponding cluster's completion.

Figure 3A:
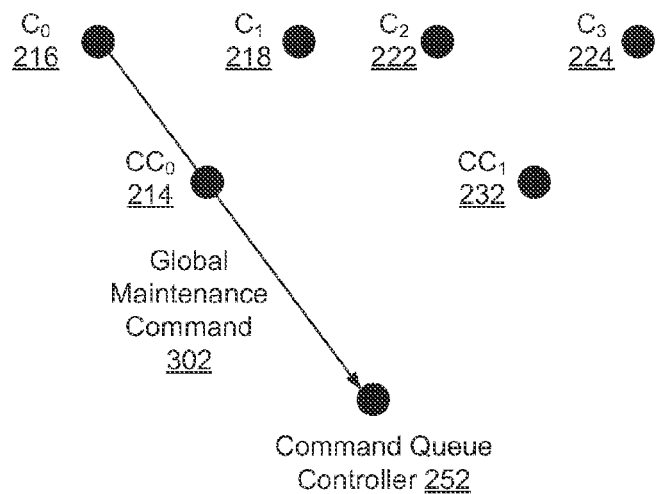
FIG. 3A sets forth a data flow diagram of one portion of an example protocol for broadcasting a global maintenance command in the example processor of FIG. 2.
Figure 3B:
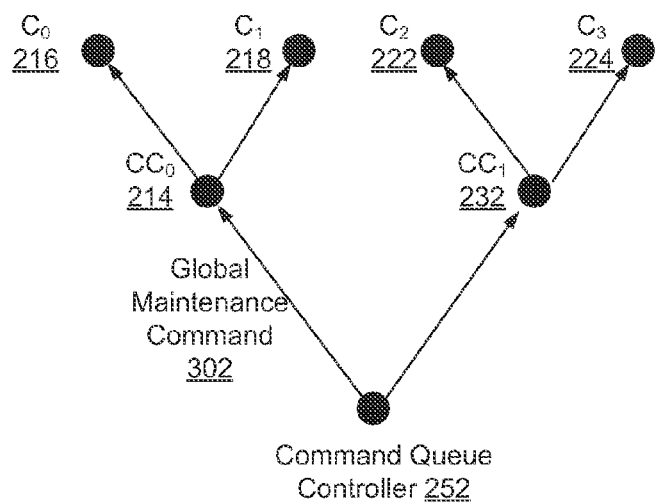
FIG. 3B sets forth an example data flow diagram of another portion of the example protocol for broadcasting a global maintenance command in the example processor of FIG. 2.

FIG. 3B illustrates a subsequent portion of the data flow depicted in FIG. 3A. In FIG. 3B, the command queue controller 252 may broadcast the global maintenance command 302 to one or more of the clusters—in this example all clusters 214 and 232, including the originating core's cluster. In other embodiments, the command queue controller 252 may selectively broadcast the global maintenance command 302 to less than all clusters. In such an embodiment, the command queue controller 252 may identify a memory address associated with the global maintenance command, identify one or more cache coherency directories 258 that include a matching memory address, and broadcast the global maintenance command only to clusters associated with a cache directory that includes the matching memory address.

Each cluster receiving the broadcast, including the originating core's cluster, may be configured to store, responsive to receipt of the broadcast, an entry for the global maintenance command in a pending request buffer of the cluster's cache. The entry may include a field identifying the global maintenance command, a field indicating completion status of the cluster, and a field for each core indicating completion of the global maintenance command by each core.

It is noted that in this example and at this point of the protocol, the PRB of the originating core's cluster includes two entries for the global maintenance command: one created upon the initial detect of the command and one created upon receipt of the broadcast.

Figure 4A:
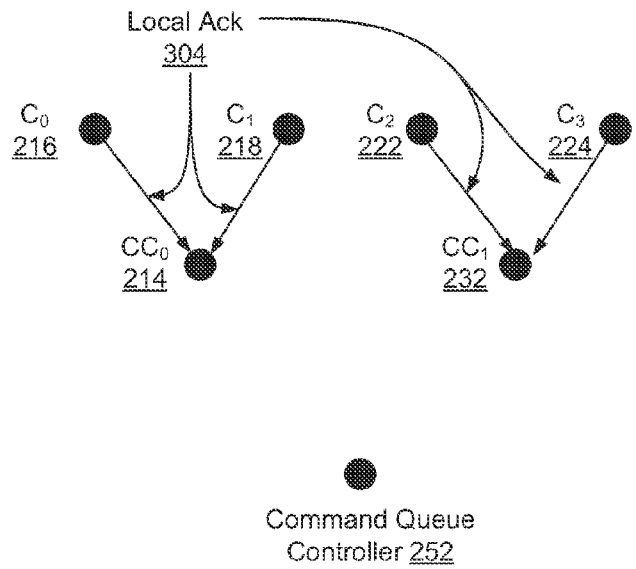
FIG. 4A sets forth an example data flow diagram of another portion of the example protocol for broadcasting a global maintenance command in the example processor of FIG. 2.

FIG. 4A illustrates a subsequent portion of the data flow depicted in FIG. 3B. In FIG. 4A, each core 216, 218, 222, and 224 executes the global maintenance command. Upon completion of the global maintenance command, each core sends a local acknowledgement 304 to the pending request buffer of that core. The local acknowledgement 304 may be indicated in the entry for the global maintenance command established upon receipt of the broadcast in a field corresponding to the core. Upon each core completing the global maintenance command, the field in the entry of the pending request buffer indicating completion status of the cluster may be set to indicate cluster completion.

Figure 4B:
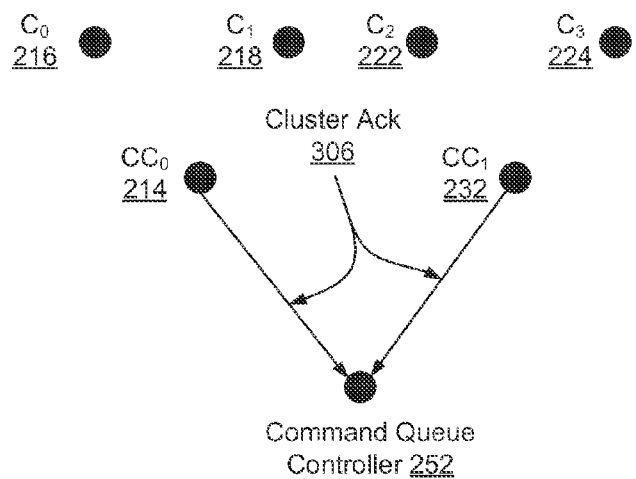
FIG. 4B sets forth an example data flow diagram of another portion of the example protocol for broadcasting a global maintenance command in the example processor of FIG. 2.

FIG. 4B illustrates a subsequent portion of the data flow depicted in FIG. 4A. In FIG. 4 B, upon receiving the local acknowledgement 304 from each core in each cluster 214, 232, the cluster, via the cache controller may send an acknowledgement, referred to here as a cluster acknowledgement 306, to the command queue controller 252. The command queue controller 252, upon receiving an acknowledgement from a core cluster may update the entry in the command queue for the global maintenance command to indicate receipt of the acknowledgement from that core cluster.

Figure 5:
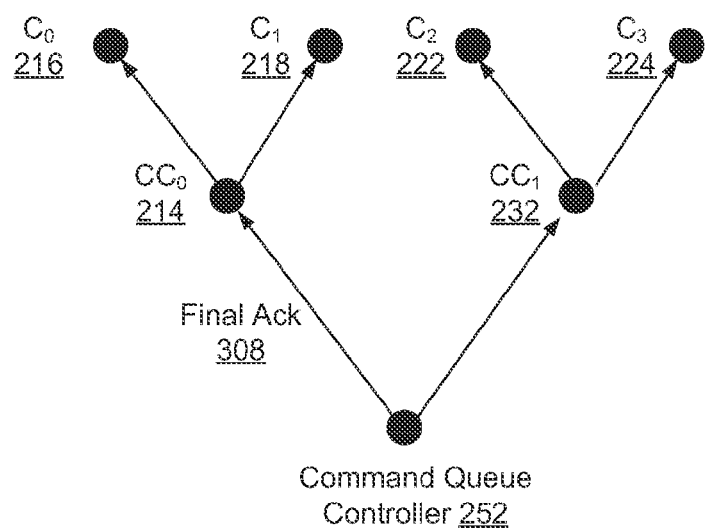
FIG. 5 sets forth an example data flow diagram of another portion of the example protocol for broadcasting a global maintenance command in the example processor of FIG. 2.

FIG. 5 illustrates a subsequent portion of the data flow depicted in FIG. 4B. In FIG. 5, upon receiving an acknowledgement from each cluster, the command queue controller may send a final acknowledgement 308 at least to the originating core's cluster. In the example of FIG. 5, the command queue controller 252 may also send a final acknowledgement of to all clusters. Upon receiving the final acknowledgement, the originating core's cluster via the core's cache controller may remove the originating entry for the global maintenance command from the pending request buffer of the originating core's cluster.

Figure 6:
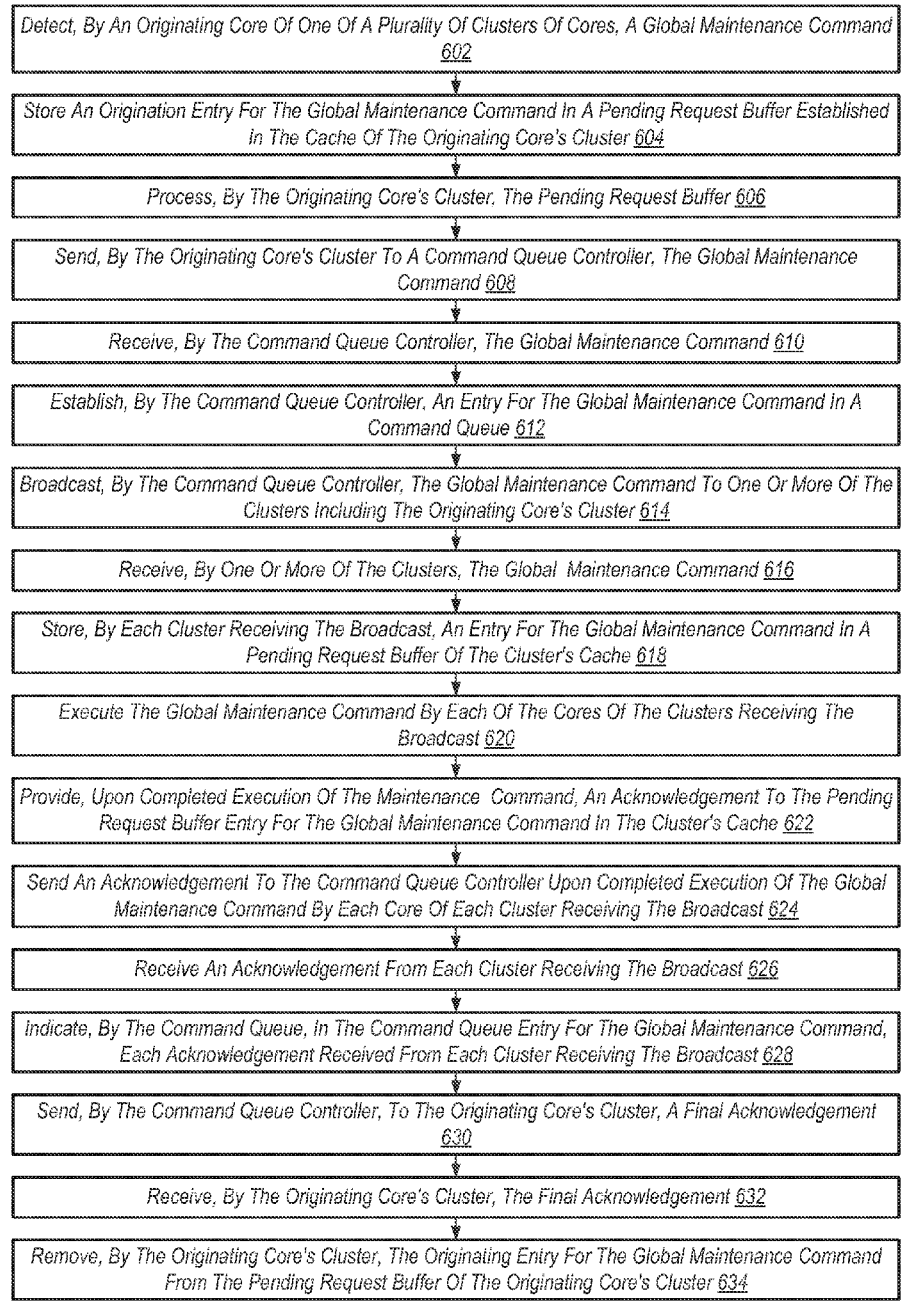
FIG. 6 sets forth a flow diagram illustrating an example method of broadcasting a global maintenance command in a system that includes a number of core clusters.

For further explanation, FIG. 6 sets forth a flow diagram illustrating an example method of broadcasting a global maintenance command in a system that includes a number of core clusters. The method of FIG. 6 may be carried out in a system similar to that of FIG. 2 in which a processor includes a number of core clusters and each core cluster includes a number of cores. Each cluster in such a processor may also include a cache that is part of a cache coherent system with other caches in other clusters.

The method of FIG. 6 includes detecting 602, by an originating core of one of a plurality of clusters of cores, a global maintenance command. Such a global maintenance command may be a non-speculative operation and may be processed by a store unit of the processor. In this way, responsive to detecting the global maintenance command, the method of FIG. 6 also includes storing 604 an origination entry for the global maintenance command in a pending request buffer established in the cache of the originating core's cluster.

The method of FIG. 6 also includes processing 606, by the originating core's cluster, the pending request buffer. In some embodiments, a cache controller of the originating core's cluster may carry out processing of the pending request buffer in a round robin fashion or in accordance with some other arbitration protocol.

The method of FIG. 6 also includes sending 608 the global maintenance command to the command queue controller upon detecting the origination entry while processing the pending request buffer. Sending 608 the global maintenance command to the command queue controller may be carried out by a cache controller of the originating core's cluster as a data communications message through a switch or other fabric.

The method of FIG. 6 also includes receiving 610, by the command queue controller, the global maintenance command and establishing 612, by the command queue controller, an entry for the global maintenance command in a command queue. The entry in the command queue may include a field identifying the originator of the global maintenance command, a field identifying the command (and its associated parameters, such as a memory address), and one field for each cluster that represents a status of completing the global maintenance command by all core's in the corresponding cluster. Each field representing cluster completion status may be implemented, in some embodiments, as a single bit.

The method of FIG. 6 also includes broadcasting 614, by the command queue controller, the global maintenance command to one or more of the clusters including the originating core's cluster. The command queue controller may broadcast 614 the global maintenance command as snoop request through a switch to one or more core clusters.

The method of FIG. 6 also includes receiving 616, by one or more of the clusters, the global maintenance command and storing 618, by each cluster receiving the broadcast, an entry for the global maintenance command in a pending request buffer of the cluster's cache. The entry for the global maintenance command in the pending request buffer may include a field identifying the global maintenance command and any associated parameters, a field representing completion status of all cores in the cluster, and one field for each core indicating the corresponding core's completion status. The field representing completion status of all cores and the fields representing completion status for each corresponding core may be implemented in some embodiments with a single bit.

The method of FIG. 6 also includes executing 620 the global maintenance command by each of the cores of the clusters receiving the broadcast and providing 622, by each core in each cluster receiving the broadcast upon completed execution of the maintenance command, an acknowledgement to the pending request buffer entry for the global maintenance command in the cluster's cache. Each core may provide an acknowledgement to the pending request buffer by storing a designated value in the field of the entry in the pending request buffer for the global maintenance command that represents completion status for the corresponding core. In embodiments in which that field is implemented as a single bit, for example, a core may 'flip' the bit in the field (from a 0 to a 1 or vice versa) to provide the acknowledgement of completion of the global maintenance command by the core.

The method of FIG. 6 also includes sending 624, by each cluster receiving the broadcast, an acknowledgement to the command queue controller upon completed execution of the global maintenance command by each core of each cluster receiving the broadcast. In embodiments, in which each field indicating a core's completion status is implemented with a single bit, the pending request buffer may be configured such that when all bits are at a value of 1 (a logic high), the bit of the field representing all core's completion status is flipped from a 0 to a 1. That is, the fields representing separate core's completion status may be ANDed together in the field representing all core's completion status. Once the field representing all core's completion status indicates that all core's have completed execution of the global maintenance command, the cache controller of the cluster may send 624 the acknowledgement to the command queue controller via the switch.

The method of FIG. 6 also includes receiving 626 an acknowledgement from each cluster receiving the broadcast and indicating 628, by the command queue, in the command queue entry for the global maintenance command, each acknowledgement received from each cluster receiving the broadcast. In a manner similar to the entry in the pending request buffer, the command queue controller may track acknowledgements from each cluster in the entry for the global maintenance command in the command queue, setting a bit for each received cluster acknowledgement.

Once the command queue receives an acknowledgement from each cluster that originally received the broadcasted global maintenance command, the method of FIG. 6 continues by sending 630, by the command queue controller, to the originating core's cluster, a final acknowledgement.

The method of FIG. 6 also includes receiving 632, by the originating core's cluster, the final acknowledgement and removing 634, by the originating core's cluster, the originating entry for the global maintenance command from the pending request buffer of the originating core's cluster.

Figure 7:
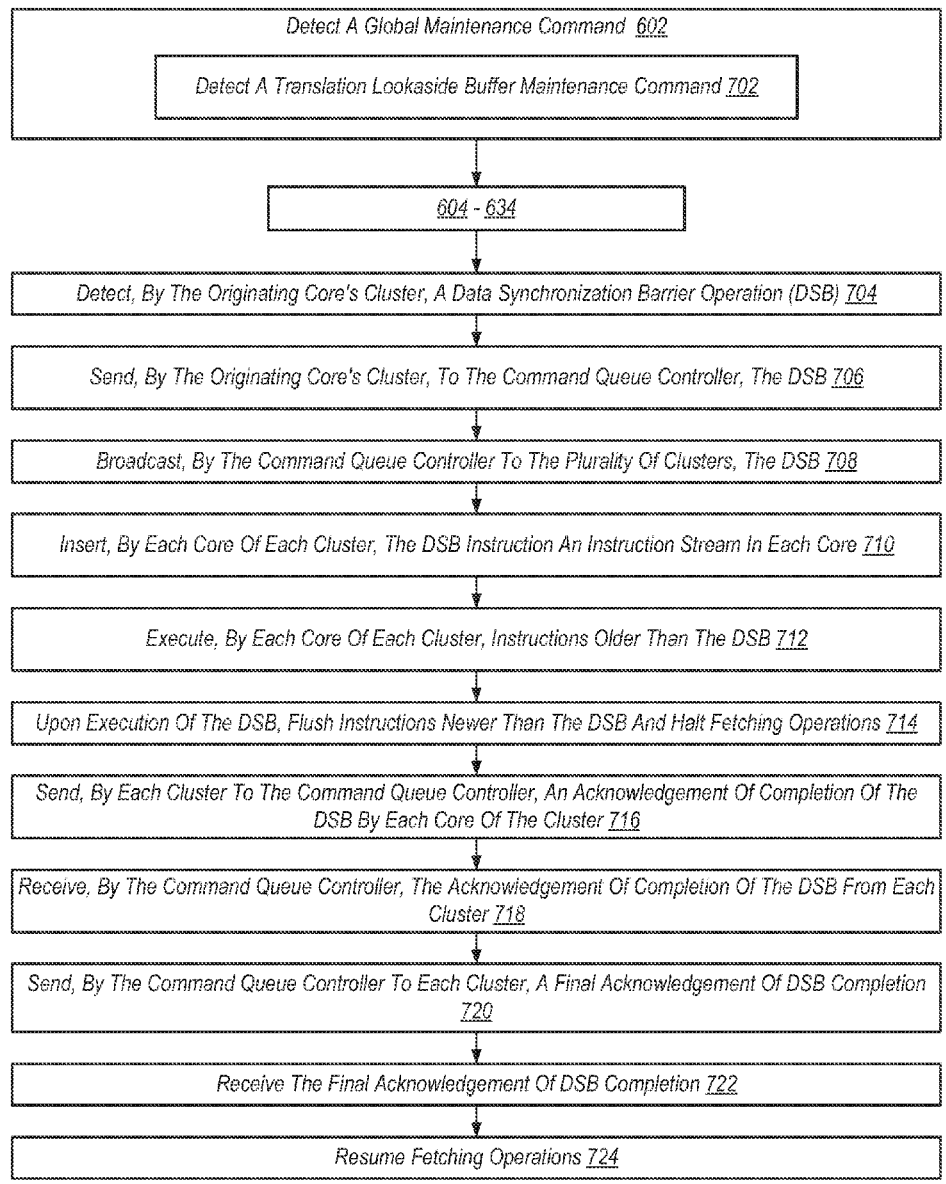
FIG. 7 sets forth a flow diagram illustrating another example method of broadcasting a global maintenance command in a system that includes a number of core clusters.

FIG. 7 sets forth a flow diagram illustrating another example method of broadcasting a global maintenance command in a system that includes a number of core clusters. FIG. 7 is similar to the method of FIG. 6 in that the method of FIG. 7 may also be carried out in a system similar to that depicted in the example of FIG. 2 and FIG. 7 includes steps 602-634.

The method of FIG. 7 differs from the method of FIG. 6, however, in that in the method of FIG. 7. detecting 602 the global maintenance command includes detecting a translation lookaside buffer (TLB) maintenance command. The TBL maintenance command is then broadcast and completed by the cluster of cores in the same manner as set forth in steps 604-634.

After receiving 632, by the originating core's cluster, the final acknowledgement of completion by the clusters of the TLB maintenance command, the method of FIG. 7 continues by detecting 704, by the originating core's cluster, a data synchronization barrier operation (DSB). A data synchronization barrier is a barrier that completes when all instructions before the data synchronization barrier completes.

Responsive to detecting 704 the DSB and that the TLB maintenance command was previously, the method of FIG. 7 continues by sending 706, by the originating core's cluster, to the command queue controller, the DSB. The command queue controller then broadcasts 708 the DSB to the plurality of clusters. On the other hand, responsive to detecting the DSB command and that there was not a previously performed TLB maintenance command, the DSB command is completed by originating core's cluster as a weak DSB command (e.g. completed within the originating core without broadcast).

Each core of each cluster inserts 710 the DSB instruction an instruction stream in each core and executes 712 instructions older than the DSB. Upon execution of the DSB, each core then flushes 714 instructions newer than the DSB and halts fetching operations.

The method of FIG. 7 continues by sending 716, by each cluster to the command queue controller, an acknowledgement of completion of the DSB by each core of the cluster and, upon receiving the acknowledgement of completion of the DSB from each cluster, sending 720, by the command queue controller to each cluster, a final acknowledgement of DSB completion. Upon receipt of the final acknowledgement of DSB completion, each core of each cluster resumes 724 fetching operations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a plurality of clusters, wherein each cluster includes a plurality of cores, and wherein each cluster includes a respective cache shared amongst the plurality of cores of the cluster; and
   a command queue controller, wherein the command queue controller is coupled to each cluster of the plurality of clusters,
   wherein each core of the plurality of cores of each of the plurality of clusters is configured to operate as an originating core by:
   detecting a global maintenance command; and
   sending, to the command queue controller, the global maintenance command;
   wherein the command queue controller is configured to broadcast the global maintenance command to one or more of the plurality of clusters including the originating core's cluster;
   wherein each core of the plurality of cores of each of the plurality of clusters receiving the broadcast is configured to execute the global maintenance command;
   wherein each cluster receiving the broadcast is configured to send an acknowledgement to the command queue controller upon completed execution of the global maintenance command by each core of each cluster receiving the broadcast; and
   wherein the command queue controller is further configured to send, upon receiving the acknowledgement from each cluster receiving the broadcast, a final acknowledgement to the originating core's cluster.

2. The system of claim 1, wherein the originating core's cluster further comprises a cache controller configured to:
   store, responsive to detecting the global maintenance command, an origination entry for the global maintenance command in a pending request buffer established in the cache of the originating core's cluster;
   process, by the originating core's cluster, the pending request buffer; and
   send the global maintenance command to the command queue controller upon detecting the origination entry while processing the pending request buffer.

3. The system of claim 2, wherein the command queue controller is further configured to:
   establish, responsive to receipt of the global maintenance command, an entry for the global maintenance command in a command queue; and
   indicate, by the command queue, in the command queue entry for the global maintenance command, each acknowledgement received from each cluster receiving the broadcast.

4. The system of claim 3, wherein:
   each cluster receiving the broadcast is further configured to store, responsive to receipt of the broadcast, an entry for the global maintenance command in a respective pending request buffer of the cluster's respective cache; and
   each core in each cluster receiving the broadcast is further configured to provide, upon completed execution of the global maintenance command, the acknowledgement to the respective pending request buffer entry for the global maintenance command in the cluster's respective cache.

5. The system of claim 4, wherein the originating core's cluster is further configured to remove, upon receiving the final acknowledgement, the originating entry for the global maintenance command from the pending request buffer of the originating core's cluster.

6. The system of claim 2, wherein the cache controller of the originating core's cluster is further configured to process the pending request buffer by processing entries of the pending request buffer according to a round robin selection algorithm based on at least one of command type and a memory region associated with each command.

7. The system of claim 2, wherein the command queue controller is further configured to broadcast the global maintenance command to one or more of the clusters by:
identifying a memory address associated with the global maintenance command;
identifying one or more cache directories that include a matching memory address, wherein each of the one or more cache directories is associated with a corresponding cluster; and
broadcasting the global maintenance command only to clusters associated with one of the one or more cache directories.

8. The system of claim 1, wherein the originating core's cluster is further configured to:
detect the global maintenance command by detecting a translation lookaside buffer maintenance command;
detect a data synchronization barrier operation (DSB) after receiving the final acknowledgement;
send, responsive to detecting the DSB, the DSB to the command queue controller;
wherein the command queue controller is further configured to broadcast the DSB to the plurality of clusters;
wherein each core of each of the plurality of clusters is further configured to:
insert the DSB into an instruction stream in each core;
execute instructions older than the DSB;
flush instructions newer than the DSB upon execution of the DSB; and
halt fetching operations; and
wherein each of the plurality of clusters is further configured to send, to the command queue controller, an acknowledgement of completion of the DSB by each core of the plurality of cores of the cluster;
wherein the command queue controller is further configured to send, upon receiving the acknowledgement of completion of the DSB from each cluster, a final acknowledgement of DSB completion to each of the plurality of clusters; and
wherein each cluster is further configured to resume fetching operations upon receipt of the final acknowledgement of DSB completion.

9. A method comprising:
operating, by each core included in a plurality of clusters, as an originating core by:
detecting a global maintenance command;
sending, to a command queue controller, the global maintenance command;
wherein each cluster of the plurality of clusters includes a respective plurality cores and a respective cache shared amongst the respective plurality of cores, and wherein the command queue controller is coupled to each cluster of the plurality of clusters;

broadcasting, by the command queue controller, the global maintenance command to one or more of the of the plurality of clusters including the originating core's cluster;
executing the global maintenance command by each core of the plurality of cores of each of the plurality of clusters receiving the broadcast;
sending, by each cluster receiving the broadcast, an acknowledgement to the command queue controller upon completed execution of the global maintenance command by each core of each cluster receiving the broadcast; and
upon receiving the acknowledgement from each cluster receiving the broadcast, sending, by the command queue controller, to the originating core's cluster, a final acknowledgement.

10. The method of claim 9, further comprising:
responsive to detecting the global maintenance command, storing an origination entry for the global maintenance command in a pending request buffer established in the cache of the originating core's cluster;
processing, by the originating core's cluster, the pending request buffer; and
sending the global maintenance command to the command queue controller upon detecting the origination entry while processing the pending request buffer.

11. The method of claim 10, further comprising:
responsive to receipt of the global maintenance command, establishing, by the command queue controller, an entry for the global maintenance command in a command queue; and
indicating, by the command queue, in the command queue entry for the global maintenance command, each acknowledgement received from each cluster receiving the broadcast.

12. The method of claim 11, further comprising:
responsive to receipt of the broadcast, storing, by each cluster receiving the broadcast, an entry for the global maintenance command in a respective pending request buffer of the cluster's respective cache; and
providing, by each core in each cluster receiving the broadcast upon completed execution of the global maintenance command, the acknowledgement to the respective pending request buffer entry for the global maintenance command in the cluster's respective cache.

13. The method of claim 12, further comprising:
upon receiving the final acknowledgement, removing, by the originating core's cluster, the originating entry for the global maintenance command from the pending request buffer of the originating core's cluster.

14. The method of claim 10, wherein processing, by the originating core's cluster,
the pending request buffer further comprises processing entries of the pending request buffer according to a round robin selection algorithm based on at least one of command type and a memory region associated with each command.

15. The method of claim 10, wherein broadcasting, by the command queue controller, the global maintenance command to one or more of the clusters includes:
identifying a memory address associated with the global maintenance command;
identifying one or more cache directories that include a matching memory address, wherein each of the one or more cache directories is associated with a corresponding cluster; and broadcasting the global maintenance command only to clusters associated with one of the one or more cache directories.

16. The method of claim 9, wherein:
detecting the global maintenance command further comprises detecting a translation lookaside buffer maintenance command;
after receiving, by the originating core's cluster, the final acknowledgement, detecting, by the originating core's cluster, a data synchronization barrier operation (DSB);
responsive to detecting the DSB, sending, by the originating core's cluster, to the command queue controller, the DSB;
broadcasting, by the command queue controller to the plurality of clusters, the DSB;
inserting, by each core of each of the plurality of clusters, the DSB into an instruction stream in each core;
executing, by each core of each of the plurality of clusters, instructions older than the DSB;
upon execution of the DSB, flushing instructions newer than the DSB and halting fetching operations; and
sending, by each of the plurality of clusters to the command queue controller, an acknowledgement of completion of the DSB by each core of the plurality of cores of the cluster;
upon receiving the acknowledgement of completion of the DSB from each of the plurality of clusters, sending, by the command queue controller to each of the plurality of clusters, a final acknowledgement of DSB completion; and
upon receipt of the final acknowledgement of DSB completion, resuming fetching operations.

17. The method as recited in claim 9 further comprising:
detecting, by the originating core's cluster, a data synchronization barrier operation (DSB);
responsive to detecting the DSB and a lack of a preceding translation lookaside buffer maintenance operation, completing the DSB within the originating core without broadcast.

18. A non-transitory, computer readable storage medium having program instructions stored therein that, in response to execution by a processor, cause the processor to perform operations including:
operating, by each core included in a plurality of clusters, as an originating core by:
detecting a global maintenance command;
sending to a command queue controller, the global maintenance command;
wherein each cluster of the plurality of clusters includes a respective plurality cores and a respective cache shared amongst the respective plurality of cores, and wherein the command queue controller is coupled to each cluster of the plurality of clusters;
broadcast, by the command queue controller, the global maintenance command to one or more of the plurality of clusters including the originating core's cluster;
execute the global maintenance command by each core of the plurality of cores of each of the plurality of clusters receiving the broadcast;
send, by each cluster receiving the broadcast, an acknowledgement to the command queue controller upon completed execution of the global maintenance command by each core of each cluster receiving the broadcast; and
upon receiving the acknowledgement from each cluster receiving the broadcast, send, by the command queue controller, to the originating core's cluster, a final acknowledgement.

19. The non-transitory, computer readable storage medium of claim 18, further comprising program instructions executable by a processor, that cause the processor to:
responsive to detecting the global maintenance command, store an origination entry for the global maintenance command in a pending request buffer established in the cache of the originating core's cluster;
process, by the originating core's cluster, the pending request buffer; and
send the global maintenance command to the command queue controller upon detecting the origination entry while processing the pending request buffer.

20. The non-transitory, computer readable storage medium of claim 19, further comprising program instructions executable by a processor, that cause the processor to:
responsive to receipt of the global maintenance command, establish, by the command queue controller, an entry for the global maintenance command in a command queue;
indicate, by the command queue, in the command queue entry for the global maintenance command, each acknowledgement received from each cluster receiving the broadcast;
responsive to receipt of the broadcast, storing, by each cluster receiving the broadcast, an entry for the global maintenance command in a respective pending request buffer of the cluster's respective cache; and
providing, by each core in each cluster receiving the broadcast upon completed execution of the global maintenance command, the acknowledgement to the respective pending request buffer entry for the global maintenance command in the cluster's respective cache.

* * * * *